Oct. 18, 1927.
M. OSTHOFF
1,646,310
MOVEMENT OF VEHICLES
Filed Sept. 28, 1925
2 Sheets-Sheet 1
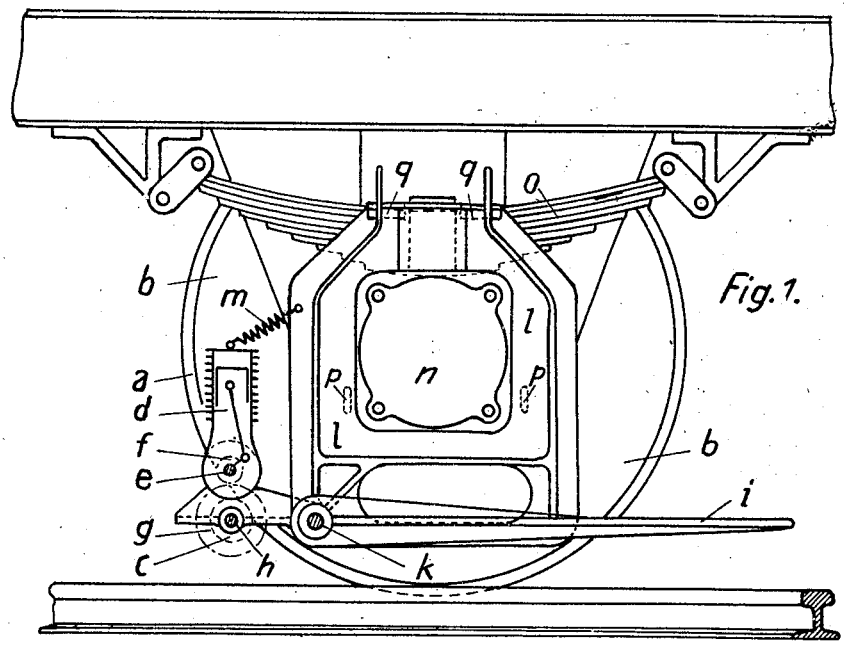
Fig. 1.
Fig. 2.
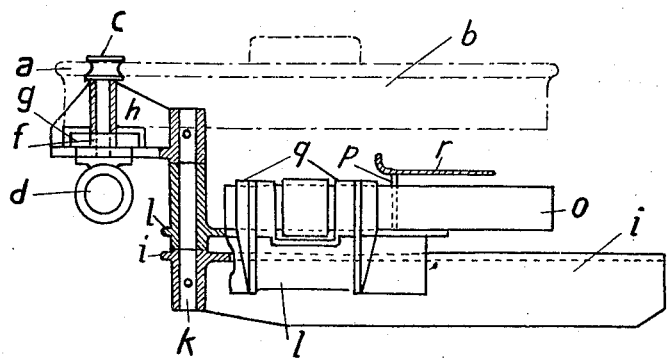
Inventor:
Max Osthoff
By
Attorney Oct. 18, 1927.

M. OSTHOFF 1,646,310

MOVEMENT OF VEHICLES

Filed Sept. 28, 1925

Inventor:
Max Osthoff
By
Attorney

Patented Oct. 18, 1927.

1,646,310

UNITED STATES PATENT OFFICE.

MAX OSTHOFF, OF COTTBUS, GERMANY.

MOVEMENT OF VEHICLES.

Application filed September 28, 1925, Serial No. 59,098, and in Germany October 7, 1924.

This invention relates to means for moving vehicles more particularly railway waggons, from one position to another. They are usually displaced by the aid of men, draught animals or locomotives. The required displacement by men, especially where there is a considerable distance to be traversed is very costly and fatiguing. Draught animals and locomotives are still more expensive and can only be used where the operation has to be frequently conducted so as to utilize fully their capacity and the cost of installation.

Electrically driven capstans work efficiently for moving wagons one at a time, but have the drawback that the hauling ropes laid above the ground are a source of obstruction and danger.

Small motor vehicles driven by electricity or petrol and attached either in front of or behind the wagons and running on the same rails as the wagons have lately been used for this purpose, but the weight of these motors prevents them from being moved, or only with considerable difficulty from one track to another, or from the front to the rear end of the wagons. If the upper surface of the rails is flush with the ground, ordinary motor carriages or lorries moving in any direction independently of the rails can be used, but such installations are expensive, are seldom used and only in confined factory yards.

According to the invention inexpensive driving devices are mounted temporarily or permanently on the wagons themselves and are adapted to rotate the wagon wheels or axles. Friction rollers may be used to engage with the flanges or the rolling surfaces of the wheels and thereby propel the vehicles.

The device is quite independent of the track, easily transportable in any direction, cheap and suitable for all wagons. It can be driven by hand or by motor or by both. Since the wheels have a large and the axles small radius, it is generally preferable to drive the wheels on account of the greater leverage. If the wheels are loose on the axles two must be driven; with fixed wheels it is generall sufficient to drive only one wheel. The required rotation can be imparted through ratchet wheels or other gearing, by magnetic induction or more simply by friction rollers.

The invention is represented by way of example in the accompanying drawing in which:—

Fig. 1 is a side elevation of a wagon wheel with the device according to the invention.

Fig. 2 is a plan.

Figure 3:
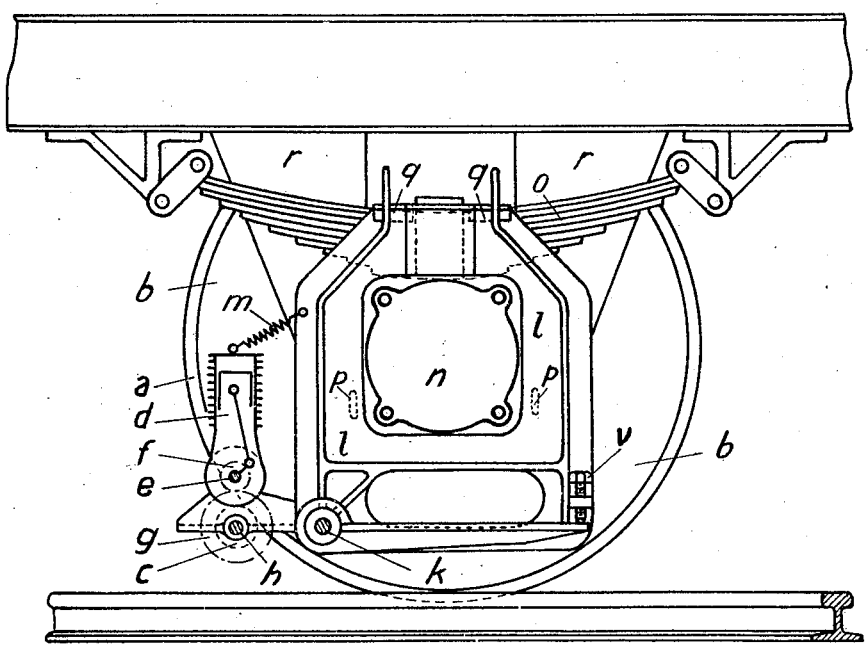
Fig. 3 shows a modified construction in side elevation.

In Figs. 1 and 2 the drive is represented by friction rollers as applied to a railway wagon. The flange $a$ of the wheel $b$ has usually inclined sides and since, to obtain the same friction, wedge-shaped wheels require a much smaller pressure to be applied than plain wheels, a suitably formed roller $c$ engages, as shown in Figs. 1 and 2, with the flange $a$ of the wheel $b$. Obviously, the plain surfaces of the wheel $b$ can be driven if the applied pressure is increased; also several rollers can be arranged, driven together or separately, and the wedge-shaped rollers can be made adjustable. The rollers can be rotated by the wagon conductor by means of a hand crank with or without the insertion of intermediate gearing. It is better, however, as shown in Figs. 1 and 2, if the friction rollers $c$ are driven by a single or multiple cylinder internal combustion engine $d$ which may be either non-reversible or provided with reversing gear for forward and backward running. Electric motors or other prime movers may also be used. Also, if necessary a hand crank drive can be provided as a reserve for the motor. In the arrangement illustrated, the motor shaft $e$ drives the shaft $h$, preferably provided with ball bearings, and the roller $c$ by two gear wheels $f$ and $g$. The wheels $f$ and $g$ may be omitted and the drive direct from the motor shaft or intermediate gearing may be provided. The position of the fuel container can be arranged as required.

The output of the motor and if required the direction of rotation of the roller and the applied pressure can be controlled by the car or wagon conductor. As shown in Figs. 1 and 2, the foot plate $i$ for the conductor is arranged to act as a lever, so that the pressure applied to the roller $c$ against the flange is provided by the weight of the conductor. The plate $i$, pivot pin $k$ and motor casing $d$ form to some extent a rigid body which is pivoted on a frame $l$ in which a spring $m$ or the like counterbalances the weight of the motor $d$ and stops limit the stroke of the foot plate $i$. The motor $d$ can be fixed, instead of pivoted, for example to the frame $l$, a gear wheel on the pin $k$ being inserted between the motor $d$ and the roller $c$.

The motor $d$ can be started without load and brought up to speed. On starting, when the resistance to the movement of the wagon (statical friction) is very great, the conductor moves further towards the right (longer lever arm and greater applied pressure). When the wagon has started the friction is reduced and the conductor steps further towards the left, but so that the pressure applied is still sufficient to prevent the roller from slipping. The wagon can only start when the conductor has stepped on the foot plate. After he has stepped off the drive ceases, and this stepping off may be arranged to stop the fuel admission or a coupling may be released. If necessary, the conductor can cause the motor to brake the running of the wagon. The arrangement according to the invention ensures complete safety during the movement of the vehicles in railway working, so that it is possible not only to move the wagons in railway stations or factory yards, but to drive them also on side lines or even on main lines.

A fixed foot plate may be provided for the conductor on which he stands on one foot, while with the other by shifting the weight of his body he controls the force applied to the lever $i$ and therewith the applied pressure. This pressure can be preliminarily adjusted or established by hand, doing away with any regulation during the drive. The lever arrangement can be constructed in many different ways, and the friction roller $c$ can be pressed against the flange $a$ by weights, for example part of the weight of the wagon, springs, screws, eccentrics, compressed air, magnets and the like.

In the modification shown in Fig. 3, a screw $v$ is used for applying the pressure to the roller $c$.

The frame $l$, which may be formed as a hollow body or of thin tubes, as in cycles, is, as shown in Figs. 1 and 2, arranged about the axle box $n$ on the spring $o$, and is held there by means of clamps $q$. In order that the frame $l$ should hang vertically even after the conductor has mounted the foot plate $i$, projections $p$ provided on the frame engage with the axle box guards $r$. Obviously, devices other than the frame $l$ can be used in order to mount the motor with its accessories on the wagon.

The mounting and dismounting of the driving device on each separate wagon always involves some amount of work, so that it is advisable to fit only a few or perhaps only a single wagon with the device temporarily or permanently, and to use this, in the same manner as a locomotive, to shift the other wagons.

It is obvious that many modifications can be made in the arrangements illustrated without departing from the scope of the invention.

Having thus described the nature of the said invention and the best means I know of carrying the same into practical effect, I claim:—

1. Means for moving wheeled vehicles, the said means comprising a friction roller, means for pressing said roller into contact with one of said wheels, mechanically driven gearing rotating said roller, a two-armed pivoted lever, on one arm of which said roller is mounted and a weight displaceable on the other arm of said lever.

2. Means for moving wheeled vehicles, the said means comprising a friction roller, means for pressing said roller into contact with one of the vehicle wheels, mechanically driven gearing for rotating said roller, a two-armed pivoted lever, on one arm of which said roller is mounted, the other arm of the lever being formed as a foot plate on which the attendant can stand.

3. Means for moving a wheeled vehicle having a wheel and an axle box for said wheel, a frame adapted to be detachably mounted around said axle box, an internal combustion engine carried by said frame, a friction roller engaging the perimeter of said wheel, and gearing connecting said internal combustion engine and said roller.

4. Means for moving a railway vehicle having a wheel, an axle box for said wheel and springs interposed between said axle box and said vehicle, a frame adapted to be detachably mounted around said axle box and clamped to said springs, an internal combustion engine carried by said frame, a friction roller also carried by said frame and engaging the perimeter of said wheel, and gearing connecting said internal combustion engine and said roller.

5. Means for moving a railway vehicle having a wheel, an axle box for said wheel and springs interposed between said axle box and said wagon, a frame adapted to be detachably mounted around said axle box and clamped to said springs, an internal combustion engine carried by said frame, a friction roller engaging the perimeter of said wheel, gearing connecting said internal combustion engine and said roller, a two-armed lever mounted in said frame, one arm of said lever carrying said friction roller and the other arm of said lever adapted to carry a displaceable weight.

6. A shunting device for vehicles having flanged wheels movable on rails, comprising friction rollers of wedge-shaped cross-section adapted to act upon said flanges, means for driving said rollers, tiltable levers for pressing the said rollers against said flanges, and a supporting frame for the said friction rollers and driving and pressing means, said frame adapted to be laterally attached to and removed from the vehicle independent of the rails and the location of the vehicle.

7. A shunting device for vehicles having flanged wheels movable on rails, comprising friction rollers of wedge-shaped cross-section adapted to act upon said flanges, means for driving said friction rollers and means for pressing said rollers against said flanges by the weight of the attendant of the wagon, and a supporting frame for said rollers and driving and pressing means adapted to be laterally attached to and removed from the vehicle independent of the rails and the location of the vehicle.

8. A shunting device for vehicles having flanged wheels movable on rails, comprising friction rollers adapted to act upon said flanges, means for driving said rollers, levers associated with said rollers and adapted to be acted upon by the weight of an attendant at different distances from its pivot for pressing the said rollers against said flanges with different pressure according to the driving resistance of the vehicle, and a supporting frame for said rollers and driving and pressing means, said frame adapted to be laterally attached to and removed from the vehicle, independent of the rails and the location of the vehicle.

In testimony whereof I have signed my name to this specification.

MAX OSTHOFF.